United States Patent [19]

Sugiura

[11] Patent Number: 4,596,178
[45] Date of Patent: Jun. 24, 1986

[54] HOUSING ASSEMBLY FOR TANDEM BRAKE BOOSTER

[75] Inventor: Yuzuru Sugiura, Anjo, Japan

[73] Assignee: Aisin Seiki Kabushiki Kaisha, Kariya, Japan

[21] Appl. No.: 714,947

[22] Filed: Mar. 22, 1985

[30] Foreign Application Priority Data

Mar. 23, 1984 [JP] Japan .............................. 59-41970[U]

[51] Int. Cl.$^4$ ............................................ B60T 13/56
[52] U.S. Cl. ..................................... 92/48; 92/98 D; 92/169; 220/22; 220/256; 220/293
[58] Field of Search .................... 92/98 D, 98 R, 169, 92/48, 64, 99; 220/256, 293, 22, 294, 295, 296, 297, 298, 299, 300, 301, 302

[56] References Cited

U.S. PATENT DOCUMENTS

| Re. 31,911 | 6/1985 | Ohta et al. | 92/169 |
| 3,083,698 | 4/1963 | Price et al. | 92/84 |
| 3,613,506 | 10/1971 | Kytta | 92/48 |
| 4,445,425 | 5/1984 | Ohmi et al. | 92/98 D |

FOREIGN PATENT DOCUMENTS 2088000 6/1982 United Kingdom .............. 92/98 D

Primary Examiner—Robert E. Garrett
Assistant Examiner—Richard S. Meyer
Attorney, Agent, or Firm—Oblon, Fisher, Spivak, McClelland & Maier

[57] ABSTRACT

A housing assembly for a tandem brake booster comprises a front shell, a rear shell coupled at its outer peripheral rim within an annular stepped flange of the front shell, and a partition wall member assembled within the front shell to subdivide the interior of the coupled shells into two chambers and having an annular radial flange interposed between an annular shoulder of the stepped flange and the outer peripheral rim of the rear shell. The annular stepped flange is formed with a plurality of circumferentially spaced radial projections engaged with the outer peripheral rim of the rear shell. The outer peripheral rim of the rear shell and the annular radial flange of the partition wall member each are formed with a plurality of circumferentially spaced radial recesses which are arranged to permit removal of the rear shell and the partition wall member from the front shell when opposed to the corresponding radial projections of the front shell. The outer peripheral rim of the rear shell is further formed with a second radial recess the inner end of which is radially inwardly spaced from the radial projections of the front shell, and the partition wall member is further formed with an axial projection engaged with the second recess of the rear shell to be radially inwardly spaced from the radial projections of the front shell.

2 Claims, 6 Drawing Figures

HOUSING ASSEMBLY FOR TANDEM BRAKE BOOSTER

BACKGROUND OF THE INVENTION

The present invention relates to a tandem brake booster adapted for use in automotive vehicles, and more particularly to an improvement of a housing assembly for the tandem brake booster which includes a front shell having an annular opening end portion in the form of an annular stepped flange, a rear shell having an outer peripheral portion coupled within the annular stepped flange of the front shell and opposed to an annular shoulder of the stepped flange, and a partition wall member assembled within the front shell to subdivide the interior of the coupled shells into front and rear chambers, the partition wall member having an annular opening end portion in the form of an annular radial flange interposed between the annular shoulder of the front shell and the outer peripheral portion of the rear shell.

In such a conventional housing assembly for tandem brake boosters as described above, the annular stepped flange of the front shell is formed with a plurality of circumferentially spaced radial projections which are engaged with the outer peripheral portion of the rear shell to fasten the partition wall member and the rear shell to the front shell, and the outer peripheral portion of the rear shell and the annular radial flange of the partition wall member each are formed with a plurality of circumferentially spaced radial recesses which are arranged to permit removal of the partition wall member and the rear shell from the front shell when opposed to the corresponding radial projections of the front shell.

In the above-described attachment of the rear shell, both the radial recesses of the rear shell and the partition wall member must be opposed to the corresponding radial projections of the front shell for removal of the rear shell and the partition wall member. For this reason, as is illustrated in FIGS. 5 and 6, the conventional partition wall member (1) is formed at its annular radial flange with an axial projection (1a), and the conventional rear shell (2) is formed at its outer peripheral portion with an axial projection (2a) which is coupled over the axial projection (1a) for rotation therewith. If in detachment the partition wall member (1) and the rear shell (2) are rotated clockwisely in error, the radial projection (3b) of front shell (3) will be raised by abutment against the axial projection (2a) of rear shell (2), resulting in damage or deformation of the radial projection (3b) of front shell (3). Such damage or deformation of the radial projection (3b) will cause loose attachment of the partition wall member (1) and the rear shell (2). Since in attachment of the rear shell (2), the axial projection (1a) of partition wall member (1) is concealed by the outer peripheral portion of rear shell (2), it is difficult to confirm whether or not the axial projection (2a) of rear shell (2) is coupled over the axial projection (1a) of partition wall member (1).

SUMMARY OF THE INVENTION

It is, therefore, a primary object of the present invention to provide an improved housing assembly for the tandem brake booster wherein the rear shell and the partition wall member can be attached to the front shell in a reliable manner and removed from the front shell without any problem described above.

According to the present invention, the primary object is accomplished by providing a housing assembly for the tandem brake booster wherein the outer peripheral portion of the rear shell is formed with a second radial recess the inner end of which is radially inwardly spaced from the radial projections of the front shell, and wherein the partition wall member is formed at the annular opening end portion thereof with an axial projection engaged with the inner end of the second radial recess of the rear shell to be radially inwardly spaced from the radial projections of the front shell.

BRIEF DESCRIPTION OF THE DRAWINGS

Additional objects and advantages of the present invention will become more apparent from the following detailed description of a preferred embodiment thereof when considered with reference to the attached drawings, in FIG. 1 is a sectional view of a tandem brake booster the housing assembly of which is constructed in accordance with the present invention.

DETAILED DESCRIPTION OF THE PREFERRED EMBODIMENT

Figure 1:
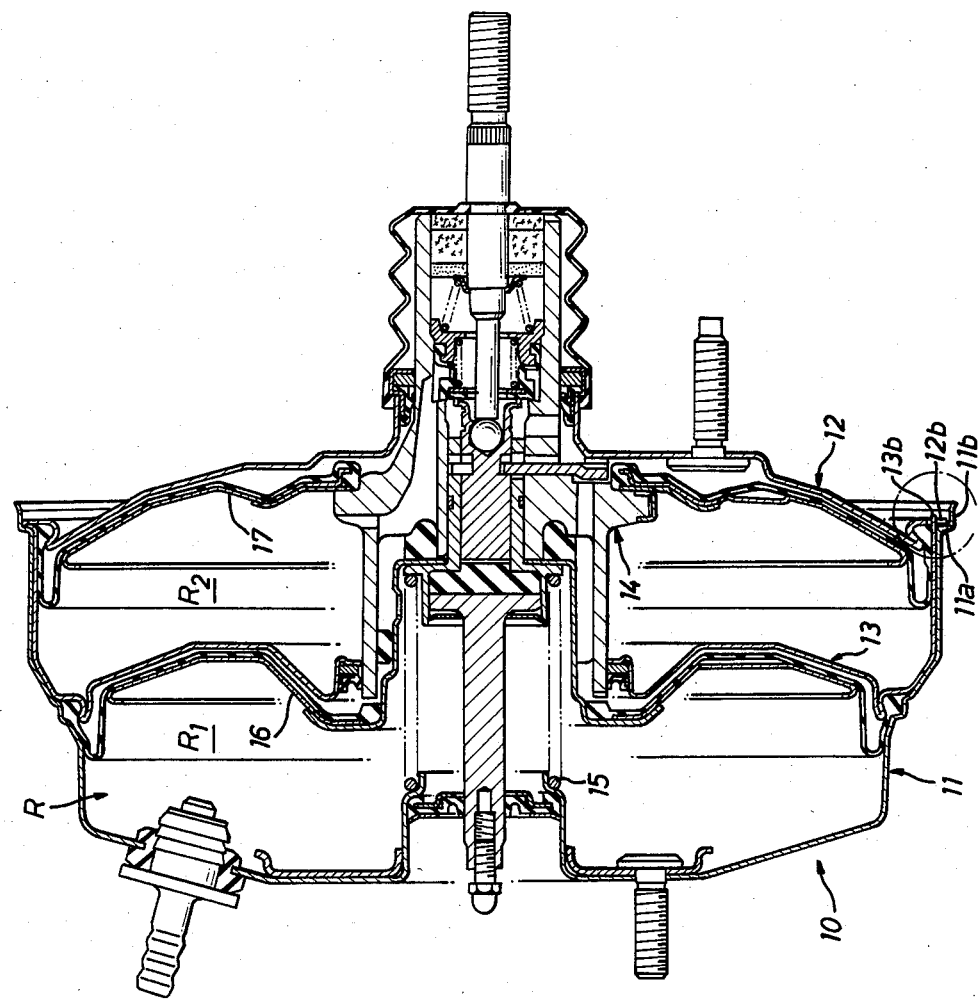
Figure 5:
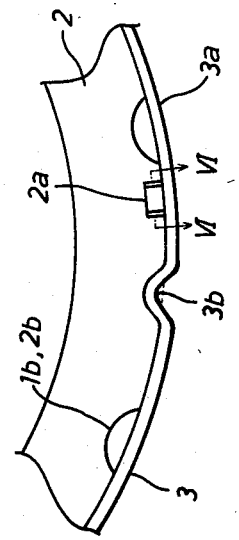
FIG. 5 is an enlarged rear view illustrating a conventional attachment portion of a rear shell.
Figure 6:
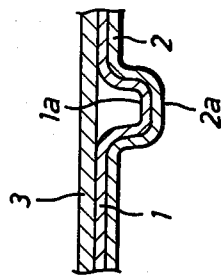
FIG. 6 is a cross-sectional view taken along line VI—VI in FIG. 5.
Figure 2:
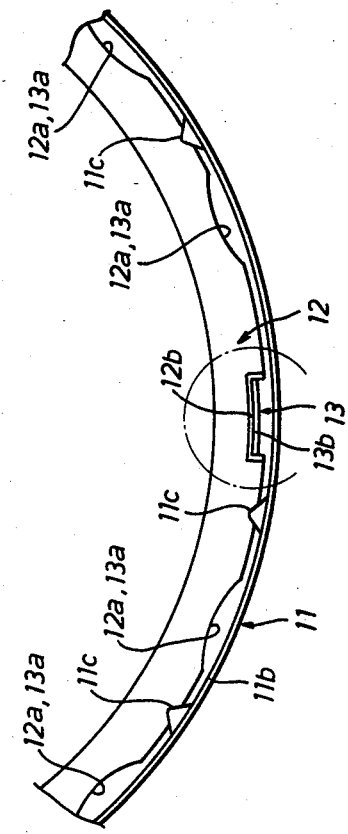
FIG. 2 is an enlarged rear view illustrating an attachment portion of a rear shell in the tandem brake booster.
Figure 4:
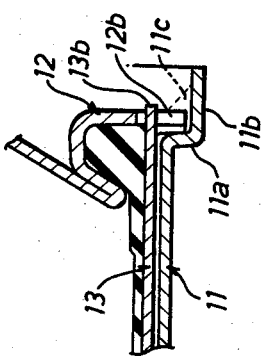
FIG. 4 is an enlarged sectional view illustrating the attachment portion of the rear shell shown in FIG. 1.
Figure 3:
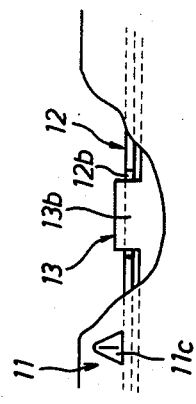
FIG. 3 illustrates the bottom of a portion encircled by dot and dash lines in FIG. 2.

Referring now to the drawings, FIG. 1 illustrates a housing assembly 10 for a tandem brake booster in accordance with the present invention. The housing assembly 10 includes a front shell 11 in the form of a bottomed cylindrical member, a rear shell 12 coupled at the outer peripheral portion thereof with an annular opening end portion of front shell 11, and a partition wall member 13 assembled within the front shell 11 to subdivide the interior R of the housing assembly 10 into front and rear chambers $R_1$ and $R_2$. The annular opening end portion of front shell 11 is in the form of an annular stepped flange 11b provided with an annular shoulder 11a. As is illustrated in FIGS. 1 to 3, the annular stepped flange 11b of front shell 11 is formed with a plurality of circumferentially spaced radial projections 11c which are engaged with the outer peripheral portion of rear shell 12 to fasten the rear shell 12 and the partition wall member 13 at the annular stepped flange 11b of front shell 11. The rear shell 12 is coupled within the annular stepped flange 11b of front shell 11 and is opposed to the annular shoulder 11a of stepped flange 11b at its outer periperal portion.

As can be well seen in FIG. 2, the outer peripheral portion of rear shell 12 is formed with a plurality of circumferentially spaced radial semi-circular recesses 12a which are arranged to permit removal of the rear shell 12 from the front shell 11 when opposed to the corresponding radial projections 11c of front shell 11. The partition wall member 13 has an annular opening end portion which is in the form of an annular radial flange interposed between the annular shoulder 11a of front shell 11 and the outer peripheral portion of rear shell 12. The annular radial flange of partition wall member 13 is formed with a plurality of circumferentially spaced radial semi-circular recesses 13a which correspond with the radial semi-circular recesses 12a of rear shell 12. In the illustration of FIG. 2, the radial semi-circular recesses 13a of partition wall member 13 are overlapped with the radial semi-circular recesses 12a of rear shell 12. In such an arrangement of the housing assembly 10, front and rear movable walls 16 and 17 are respectively assembled in a usual manner within the front and rear chambers $R_1$ and $R_2$ and connected to each other by means of a piston body 14 which is axially slidably supported on the partition wall member 13. The piston body 14 is biased rightward by means of a compression coil spring 15 which is carried on the inner end wall of front shell 11.

As is illustrated in FIGS. 1 to 4, the outer peripheral portion of rear shell 12 is further formed with a rectangular radial recess 12b, and the partition wall member 13 is further formed at the annular opening end portion thereof with a rectangular axial projection 13b. The inner end of rectangular radial recess 12b is radially inwardly spaced from the radial projections 11c of front shell 11. The rectangular axial projection 13b of partition wall member 13 is engaged with the inner end of rectangular radial recess 12b to be radially inwardly spaced from the radial projections 11c of front shell 11. When the rear shell 12 is rotated clockwisely or counterclockwisely for removal from the front shell 11, the partition wall member 13 is rotated in the same direction by engagement with the rear shell 12 at its rectangular axial projection 13b without causing any abutment against the radial projections 11c of front shell 11. When the respective semi-circular radial recesses 12a, 13a of rear shell 12 and partition wall member 13 are opposed to the corresponding radial projections 11c of front shell 11, the rear shell 12, partition wall member 13 and piston body 14 are pushed outwardly from the front shell 11 by the biasing force of spring 15.

When the rear shell 12 is coupled within the annular stepped flange 11b of front shell 11, the outer peripheral portion of rear shell 12 is overlapped with the annular radial flange of partition wall member 13 in such a way to engage the rectangular axial projection 13b of partition wall member 13 with the inner end of rectangular radial recess 12b of rear shell 12. Thus, the semi-circular radial recesses 12a, 13a of rear shell 12 and partition wall member 13 are overlapped to each other, and the rectangular axial projection 13b of partition wall member 13 juts out of the outer peripheral portion of rear shell 12. It is therefore able to confirm correct attachment of the rear shell 12 and the partition wall member 13 to the front shell 11.

Although a specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. In a housing assembly for a tandem brake booster comprising a front shell having an annular opening end portion in the form of an annular stepped flange, a rear shell having an outer peripheral portion coupled within the annular stepped flange of said front shell and opposed to an annular shoulder of said stepped flange, and a partition wall member assembled within said front shell to subdivide the interior of said coupled shells into front and rear chambers, said partition wall member having an annular opening end portion in the form of an annular radial flange interposed between the annular shoulder of said stepped flange and the outer peripheral portion of said rear shell, and wherein said annular stepped flange is formed with a plurality of circumferentially spaced radial projections engaged with the outer peripheral portion of said rear shell to fasten said rear shell and said partition wall member to said front shell, the outer peripheral portion of said rear shell and the annular radial flange of said partition wall member each being formed with a plurality of circumferentially spaced radial recesses which are arranged to permit removal of said rear shell and said partition wall member from said front shell when opposed to the corresponding radial projections of said front shell, the improvement wherein the outer peripheral portion of said rear shell is formed with a second radial recess the inner end of which is radially inwardly spaced from the radial projections of said front shell, and wherein said partition wall member is formed at the annular opening end portion thereof with an axial projection engaged with the inner end of the second radial recess of said rear shell to be radially inwardly spaced from the radial projections of said front shell.

2. A housing assembly for a tandem brake booster as recited in claim 1, wherein the second radial recess of said rear shell is in the form of a rectangular radial recess, and the axial projection of said partition wall member is in the form of a rectangular axial projection arranged to jut out of the outer peripheral portion of said rear shell.

* * * * *